(12) United States Patent
Modinger et al.

(10) Patent No.: US 10,746,204 B2
(45) Date of Patent: Aug. 18, 2020

(54) ROTARY DRIVE HAVING A POSITION DETECTION DEVICE AND CALIBRATION METHOD

(71) Applicant: Festo SE & Co. KG, Esslingen (DE)

(72) Inventors: Uwe Modinger, Wernau (DE); Mathias Schneider, Stuttgart (DE); Karl Messerschmidt, Esslingen (DE); Andreas Feiler, Schwabisch Gmund (DE)

(73) Assignee: FESTO SE & CO. KG, Esslingen (DE)

( * ) Notice: Subject to any disclaimer, the term of this patent is extended or adjusted under 35 U.S.C. 154(b) by 135 days.

(21) Appl. No.: 15/567,622

(22) PCT Filed: Jun. 15, 2015

(86) PCT No.: PCT/EP2015/063330
§ 371 (c)(1),
(2) Date: Oct. 19, 2017

(87) PCT Pub. No.: WO2016/202355
PCT Pub. Date: Dec. 22, 2016

(65) Prior Publication Data
US 2018/0087549 A1    Mar. 29, 2018

(51) Int. Cl.
*F15B 19/00*      (2006.01)
*F16K 37/00*      (2006.01)
(Continued)

(52) U.S. Cl.
CPC .......... *F15B 19/002* (2013.01); *F15B 15/065* (2013.01); *F15B 15/2807* (2013.01);
(Continued)

(58) Field of Classification Search
CPC ............. F16K 37/0025; F16K 37/0033; F16K 37/0041; F16K 31/1635; Y10T 137/8242; G01D 5/145; F15B 19/002; F15B 19/005
See application file for complete search history.

(56) References Cited

U.S. PATENT DOCUMENTS 5,518,028 A * 5/1996 Walker ................ F16K 37/0033
137/554
6,044,791 A * 4/2000 LaMarca ............. F16K 37/0058
116/277
(Continued)

FOREIGN PATENT DOCUMENTS

CN        103842701 A     6/2014
DE        10350305 A1     5/2005
(Continued)

*Primary Examiner* — Atif H Chaudry
(74) *Attorney, Agent, or Firm* — Hoffmann & Baron, LLP

(57) ABSTRACT

A rotary drive for actuating a valve element of a valve fitting, having a housing, which has a drive device and a pivot-mounted driven shaft which can be driven by the drive device and which can be coupled to the valve element, and a position detection device for detecting a position of the driven shaft, wherein the position detection device has a magnet module attached to the driven shaft in a torque-proof manner and a sensor module which is fitted onto or into the housing and is designed to detect a magnetic field measurement value according to the magnetic field generated by the magnet module. The the magnet module and/or the sensor module is attached such that it can be removed from the rotary drive, and the rotary drive includes a control device, which is adapted to determine if the magnet module or the sensor module is removed from the rotary drive.

6 Claims, 7 Drawing Sheets

(51) Int. Cl.
*F15B 15/28* (2006.01)
*G01D 5/14* (2006.01)
*F16K 31/163* (2006.01)
*F15B 15/06* (2006.01)
*G01D 18/00* (2006.01)
*F16K 31/122* (2006.01)
*F16K 31/54* (2006.01)

(52) U.S. Cl.
CPC ........ *F15B 19/005* (2013.01); *F16K 31/1225* (2013.01); *F16K 31/1635* (2013.01); *F16K 31/54* (2013.01); *F16K 37/0025* (2013.01); *F16K 37/0033* (2013.01); *F16K 37/0041* (2013.01); *G01D 5/145* (2013.01); *G01D 18/00* (2013.01); *F15B 2211/85* (2013.01); *F15B 2211/8752* (2013.01); *Y10T 137/8242* (2015.04)

(56) References Cited

U.S. PATENT DOCUMENTS

| | | |
|---|---|---|
| 6,135,147 A | 10/2000 | Peters et al. |
| 2006/0028326 A1* | 2/2006 | Haas .................... B60C 23/0408 340/426.33 |
| 2011/0210210 A1* | 9/2011 | Lebrun .................... H02P 6/16 244/194 |
| 2015/0053283 A1* | 2/2015 | Robson ............... F16K 37/0033 137/554 |
| 2016/0025765 A1* | 1/2016 | Panther .................. G01B 21/00 702/150 |

FOREIGN PATENT DOCUMENTS

| | | |
|---|---|---|
| DE | 102007010115 | 9/2008 |
| EP | 1325236 A1 | 7/2003 |
| EP | 1422452 | 5/2004 |

* cited by examiner

ROTARY DRIVE HAVING A POSITION DETECTION DEVICE AND CALIBRATION METHOD

This application claims priority based on an International Application filed under the Patent Cooperation Treaty, PCT/EP2015/063330, filed Jun. 15, 2015.

BACKGROUND OF THE INVENTION

The invention relates to a rotary drive for actuating a valve element of a valve fitting, having a housing, which has a drive device and a pivot-mounted driven shaft which can be driven by the drive device and which can be coupled to the valve element, and a position detection device for detecting a position of the driven shaft, wherein the position detection device has a magnet module attached to the driven shaft in a torque-proof manner and a sensor module which is fitted onto or into the housing and is adapted to detect a magnetic field measurement value according to the magnetic field generated by the magnet module.

A rotary drive of this type can be attached to a valve fitting or process valve in order to actuate a valve element of the valve fitting, the valve element being located in a process fluid, and in this way manipulate and/or block a fluid flow. The driven shaft of the rotary drive is mechanically coupled to a spindle of the valve fitting. The spindle in turn is mechanically coupled to the valve element of the valve fitting, so that the valve element is actuated via an actuation of the spindle. The valve element of the valve fitting is, for example, formed as a damper, butterfly valve, plug valve, spherical valve or ball valve.

From U.S. Pat. No. 6,135,147A, a rotary drive is known, having a monitoring arrangement which is attached to the top of the housing of the rotary drive and which serves to detect the position of the driven shaft. For this purpose, an indicating device provided with magnets is fastened to the driven shaft protruding out of the top of the housing, this indicating device rotating together with the driven shaft. In addition, magnetic switches, which depending on the position of the magnets cause light-emitting diodes to be fed with current, are provided in a monitoring arrangement which is arranged on the top of the housing next to the indicating device.

SUMMARY OF THE INVENTION

It is an object of the invention to provide a rotary drive of the type mentioned at the outset with an input option, by means of which a user can put the rotary drive into a predefined operating state, such as a calibration state, in a way which is simple and practical.

The object is achieved for a fluid-actuated rotary drive of the type described at the outset by means of the features of Claim 1.

In the case of the rotary drive according to the invention, the magnet module and/or the sensor module is attached such that it can be removed from the rotary drive and the rotary drive comprises a control device, which is designed to determine, according to the magnetic field measurement value, that the magnet module or the sensor module is being or has been removed from the rotary drive or is being or has been attached to the rotary drive, and, depending on the determination made, to cause the rotary drive to be put into a predefined operating state.

Thus, according to the invention the magnet module and/or the sensor module serves as an input device, by means of which a user can cause that the rotary drive is put into a predefined operating state. The user input is effected by the user removing the magnet module or the sensor module from the rotary drive or, in a state in which the magnet module or the sensor module has already been removed, by the user attaching the magnet module or the sensor module to the rotary drive.

The magnet module and the sensor module form part of the position detection device which is already provided on the rotary drive in order to detect a position of the driven shaft. Therefore, no additional input device, such as a special switch, has to be provided to make the input option available. Instead, the modules already present on the rotary drive are advantageously used in order to provide a further function—namely the input option by the user.

The removal of the magnet module or of the sensor module is determined or recognised by the control device according to the magnetic field measurement value detected by the sensor module. In particular, the magnetic field measurement function of the sensor module is used which already serves to detect the position of the driven shaft and therefore is already present in any case. Hence, no additional sensor device has to be provided to detect the removal or attachment of the magnet module or of the sensor module.

Preferably, the invention can be implemented according to the following two variants.

According to the first variant, the magnet module is attached to or arranged on the driven shaft such that it can be removed, while the sensor module is fastened to the housing so that it preferably cannot be removed from the housing without loosening a fastening means, such as a screw. The magnet module is, for example, attached onto an axial end of the driven shaft so that it is removable without a fastening means, such as a screw, having to be loosened for this purpose. The sensor module is adapted to detect a magnetic field measurement value according to the magnetic field generated by the magnet module. As long as the magnet module is attached to the driven shaft, the magnetic field measurement value detected by the sensor module lies within a specific value range. If the magnet module is removed, the distance between the magnet module and the sensor module increases and the detected magnetic field measurement value leaves the specific value range. Hence, it can be determined according to the magnetic field measurement value that the magnet module has been removed and based on this determination it is possible to cause that the rotary drive is put into a predefined operating state. Determining whether or that the magnet module has been removed is carried out by a control device. The control device is preferably provided in the sensor module.

In order to cause that the rotary drive is put into the predefined operating state, the control device either adopts this operating state itself and/or issues one or more corresponding commands to other units of the rotary drive or to units connected to the rotary drive.

According to the first variant, it is also possible to detect an attachment of the magnet module to the driven shaft. As long as the magnet module is not attached to the driven shaft or is kept removed from the rotary drive, the magnetic field measurement value detected by the sensor module lies outside the above mentioned specific value range. If the magnet module is now being attached to the driven shaft, then the magnetic field measurement value moves into the above mentioned value range again. This change can be detected by means of the control device and based on this, as already described above, it is possible to cause the rotary drive to adopt a predefined operating state.

Preferably, the rotary drive or the control device is adapted such that, by removal of the magnet module, a first operating state is adopted, and, by attachment of the magnet module, a second operating state is adopted which is different from the first operating state.

Alternatively or in addition to the above described first variant, the rotary drive can also be implemented according to a second variant.

According to the second variant, in particular the sensor module is attached to the housing of the rotary drive removably by, for example, being plugged in a plug connection fixed to the housing. According to the second variation, the sensor module is therefore the element which can be removed from or attached to the rotary drive by a user, in order to cause the rotary drive to be put into a predefined operating state.

According to the second variant, the control device is preferably arranged separate from the sensor module on or in the housing of the rotary drive, so that even when the sensor module has been removed, the function of the control device is still available. If the control device is arranged separate from the sensor module, the detected magnetic field measurement value is output from the sensor module to the control device. The control device is preferably adapted to determine or recognise that the sensor module has been removed when it no longer receives any valid magnetic field measurement value from the control device. Furthermore, the control device is adapted to recognise an attachment of the sensor module when it begins to receive valid magnetic field measurement values.

Alternatively or in addition to this, the sensor module can also remain in contact with the rotary drive via a cable, even if it has been removed from the rotary drive. In this case, the control device can be integrated in the sensor module and the detection of magnetic field measurement values can even take place with the sensor module removed. The removal or attachment of the sensor module from the rotary drive can then be determined or recognised by the detected magnetic field measurement value leaving a specific value range or moving into a specific vale range, as has already been described above in connection with the first variant.

Preferably, the rotary drive or the control device are adapted such that, by removal of the the sensor module, a first operating state is adopted, and, by attachment of the sensor module, a second operating state is adopted which is different from the first operating state.

Advantageously, the rotary drive or the control device is adapted to carry out at least one predefined operation based on the determination of the removal and/or attachment of the magnet module or of the sensor module.

The magnet module is attached to the driven shaft in a torque-proof manner and thus receives a rotational movement from the driven shaft. This means that the magnet module rotates together with the driven shaft or is pivoted by it. Correspondingly, the position of the magnet module is determined by the position of the driven shaft. The magnet module may be directly fastened to the driven shaft for this purpose.

The magnet module preferably comprises a magnet arrangement which in particular is adapted and/or arranged in such a way that the sensor module detects different magnetic field measurement values for different positions of the driven shaft. For this purpose, the magnet arrangement can be provided with a spatially varying magnetisation. Alternatively or in addition to this, the magnet arrangement can be arranged relative to the driven shaft in such a way that the magnetic field generated by the magnet arrangement is not circularly symmetrical in at least one spatial direction in relation to the axial direction of the driven shaft.

The sensor module is adapted to detect a magnetic field measurement value according to the magnetic field generated by the magnet arrangement. For this purpose, the sensor module has, for example, a Hall sensor, in particular a 3D Hall sensor, which is adapted to detect a magnetic field strength in one or more spatial directions.

The position detection unit serves to detect a position of the driven shaft. Preferably, the position detection unit is adapted to provide a position signal corresponding to a position or angular position of the driven shaft dependent on the magnetic field measurement value. Preferably, the position detection unit comprises evaluation electronics for this purpose which convert the detected magnetic field measurement value into a position signal representing the angular position of the driven shaft. The evaluation electronics can in particular be provided in the sensor module. Preferably, the control device comprises the evaluation electronics.

The position detection unit is preferably adapted to detect one or more angular positions of the driven shaft, such as both end positions of the driven shaft, and to represent them in the position signal. In this context, end positions are in particular positions of the driven shaft, in which a valve element of a valve fitting actuated by the rotary drive is fully open or closed. In addition to this, the position detection unit can also be designed to detect any angular positions of the driven shaft between the end positions and to represent them in the position signal.

Advantageous further embodiments of the invention are the subject matter of the dependent claims.

In one embodiment of the invention, the control device is adapted to put the rotary drive into a calibration state if attachment of the magnet module or the sensor module has been determined.

In the case of a rotary drive of the type mentioned at the outset, it may be required to calibrate the position detection device to the effect that one or more specific positions of the driven shaft, such as the two end positions of the driven shaft, are assigned to the magnetic field measurement values which the sensor module detects when the driven shaft is in this or these predefined position(s). If such an assignment is stored in the control device, the control device may then derive from a detected magnetic field measurement value a specific position of the driven shaft and provide a corresponding position signal.

Preferably, the rotary drive or the control device is adapted to adopt the calibration state if the control device determines that the magnet module is being attached to the driven shaft.

This is particularly advantageous, since in some circumstances, when a new magnet module is attached, the above described calibration has to be carried out in any case. Therefore, it is particularly practical to trigger the calibration process directly through the attachment of the magnet module.

In a further embodiment of the invention, the control device is adapted to store, in the calibration state, at least one detected magnetic field measurement value in assignment to at least one predefined position, preferably an end position, of the driven shaft.

As already described above, in the calibration state it is detected which magnetic field measurement value corresponds to a predefined position of the driven shaft. In particular, this is carried out for the two end positions of the driven shaft.

This may in particular be required after the end positions have been reset via positioning elements.

In a further embodiment of the invention, the control device is adapted to store a detected magnetic field measurement value in assignment to a predefined position of the driven shaft, if, for a predefined period of time, the magnetic field measurement value detected by the sensor module is constant within a predefined tolerance range.

In the calibration state, the predefined position, preferably one or both end positions of the driven shaft, is moved to. This can occur by the control device issuing a corresponding control command to the drive device. Alternatively, a movement to the predefined position can also be instructed or brought about via an external control unit connected to the rotary drive. If the end position is moved to, then the driven shaft can no longer be further rotated. In this case, the magnetic field measurement value detected by the sensor module also remains constant. The control device is correspondingly adapted to detect, in the calibration state, that a detected magnetic field measurement value is constant within a predefined tolerance range for a predefined period of time and, in this case, to store the detected magnetic field measurement value as a magnetic field measurement value indicating the end position or assigned to the end position. Preferably, the control device is adapted to carry out the described procedure for one or both end positions of the driven shaft.

In a further embodiment of the invention, the control device is adapted to, when it has been determined that the magnet module or the sensor module has been removed, put the rotary drive into an error state, in which the control device provides an error signal and/or deletes the at least one magnetic field measurement value stored in association with the at least one position.

Preferably, the control device is adapted to put the rotary drive into the error state if it is determined that the magnet module has been removed.

In a further embodiment of the invention, the rotary drive is fluid-actuated and the drive device comprises a piston space, a drive piston arrangement, which is arranged in the piston space, is mechanically coupled to the driven shaft and subdivides the piston space into a plurality of chambers, and a control valve arrangement which is adapted to supply at least one of the chambers with a pressurised fluid.

Preferably, the housing has a tubular body, in which the piston space is provided. Advantageously, the drive piston arrangement comprises a first and a second drive piston which subdivide the piston space into at least two chambers. Advantageously, the two chambers can have different pressures applied to them to bring about a linear movement of the drive piston and consequently a rotational movement of the driven shaft.

In a further embodiment of the invention, the control device is adapted to, when it has been determined that the magnet module or the sensor module has been removed, put the rotary drive into a ventilation state, in which at least one of the chambers is ventilated.

Preferably, the control device is adapted to put the rotary drive into the ventilation state if it is determined that the magnet module has been removed.

Advantageously, in the ventilation state, the control device is designed to output a corresponding signal to a control valve arrangement, in order to bring about a ventilation of a chamber via the control valve arrangement.

In a further embodiment of the invention, the control device is adapted to, when it has been determined that the magnet module or the sensor module has been removed, put the rotary drive into a maintenance state, in which the control valve arrangement is disabled, so that the driven shaft cannot be driven by the drive device.

Preferably, the control device is adapted to put the rotary drive into the maintenance state when it is determined that the magnet module has been removed.

Advantageously, in the maintenance state, the control device is adapted to output a corresponding signal to the drive device, for example to a control valve arrangement, in order to cause the drive device to be disabled.

In a further embodiment of the invention, the control device is adapted to, when it has been determined that the magnet module or the sensor module has been removed, put the rotary drive into an emergency shutdown state, in which the driven shaft is moved into a predefined emergency shutdown position and/or a torque applied to the driven shaft by the drive device is reduced.

Preferably, the control device is adapted to put the rotary drive into the emergency shutdown state when it is determined that the magnet module has been removed.

Advantageously, in the emergency shutdown state, the control device is designed to output a corresponding signal to the drive device, for example to a control valve arrangement, in order to cause the driven shaft to be moved into the emergency shutdown position and/or the torque to be reduced.

In a further embodiment of the invention, an axial end of the driven shaft is brought out of a wall section of the housing and the magnet module is mounted onto the axial end of the driven shaft.

Thus, the magnet module is arranged on the outside of the housing and can thereby be removed or attached by the user in a particularly simple way.

In a further embodiment of the invention, the magnet module is adapted as a position indicator which has an indicating element, preferably a marking, for visually indicating a position of the driven shaft and a magnet arrangement.

The position indicator can in particular be cylinder-shaped or disc-shaped and arranged coaxially in relation to the driven shaft. In particular, the position indicator is in the shape of a puck. Preferably, a magnet arrangement is arranged in a lower or upper section of the position indicator, so that it is arranged close to the sensor module. In particular, the sensor module and the position indicator are arranged or adapted such that the sensor module extends to below or above the position indicator.

Preferably, the indicating element or the marking is not circularly symmetrical in relation to the axial direction of the driven shaft, so that visually the current angular position of the driven shaft can be deduced from the alignment of the indicating element or marking.

The position indicator therefore serves three different purposes. Firstly, it enables a user to visually determine, by means of the indicating element, the current angular position of the driven shaft and as a consequence also an angular position of a valve element of a valve fitting actuated by the driven shaft. The position indicator further serves to accommodate the magnet arrangement and rotate or pivot relative to the sensor module according to a rotational movement of the driven shaft, so that at the sensor module the rotational movement or a change in the angular position of the driven shaft caused as a result of this leads to an altered magnetic field and hence can be detected. Finally, the position indicator also serves as an input device, by means of which a user by removing or attaching the position indicator on the driven shaft can cause the rotary drive to be put into a predefined operating state.

Preferably, the magnet module adapted as a position indicator comprises a magnet arrangement which has a permanent magnet which is preferably ring-shaped, in particular is formed as a ring segment.

In particular, the permanent magnet which is ring-shaped or is formed as a ring segment is arranged concentrically in relation to the driven shaft, so that the distance between the permanent magnet and the sensor module during a rotation of the driven shaft between the two end positions of the driven shaft remains constant. The permanent magnet can in particular have a varying magnetisation along its circumference.

In a further embodiment of the invention, the magnet arrangement comprises one or more magnetic bars. The magnetic bar or the magnetic bars is or are preferably not arranged coaxially in relation to the driven shaft.

In a further embodiment of the invention, the sensor module is arranged in a receiving chamber in the wall section of the housing.

Since the sensor module is provided in the housing and is not arranged on the housing next to the magnet module, the magnet module is exposed and is therefore within easy reach for the user and can be easily removed from the axial end of the driven shaft or attached onto it.

The sensor module is arranged inside in the wall of the housing. A practical and compact design thereby results, in which the sensor module hardly increases the installation space for the rotary drive or does not increase it at all. In addition, the sensor module is thereby optimally protected against mechanical damage and harmful environmental influences.

The sensor module is also arranged in the same wall section of the housing, out of which the axial end of the driven shaft is brought. This is advantageous because as a result the distance between the magnet arrangement and the sensor module is reduced, so that the magnetic field of the magnet arrangement can be detected better and the requirements for the magnet arrangement and the sensor module are lower.

In particular, the receiving chamber is elongate and aligned in the direction of the axial end of the driven shaft. The sensor module can in this way be brought particularly close to the magnet module arranged on the axial end of the driven shaft.

In a further embodiment of the invention, the sensor module is attached to the wall section such that it can be removed and preferably extends over the magnet module.

In particular, the sensor module is box-shaped and has a hollow space, in which the magnet module is accommodated when the sensor module is attached to the housing of the rotary drive.

Furthermore, in accordance with the invention, a calibration method is provided for a rotary drive having a housing which has a drive device and a pivot-mounted driven shaft which can be driven by the drive device, comprising the steps: detecting, by means of a sensor module arranged on or in the housing, a magnetic field measurement value according to a magnetic field generated by a magnet module, determining, according to the magnetic field measurement value, that the magnet module is being attached to the driven shaft, moving the driven shaft to a predefined position and storing a magnetic field measurement value, which has been detected by the magnet module, in assignment to the predefined position.

Preferably, the calibration method can be carried out by means of the above described rotary drive.

With regard to the calibration method, in particular the steps of moving to the predefined position and storing the detected magnetic field measurement value are only carried out if it has been determined that the magnet module is being or has been attached to the driven shaft.

Exemplary embodiments of the invention are illustrated in the figures.

DETAILED DESCRIPTION OF THE PREFERRED EMBODIMENTS

In the description of the figures below, the same names are used for components of the illustrated embodiments which have the same functions, wherein a repeated description of components which have the same functions is omitted.

Figure 1:
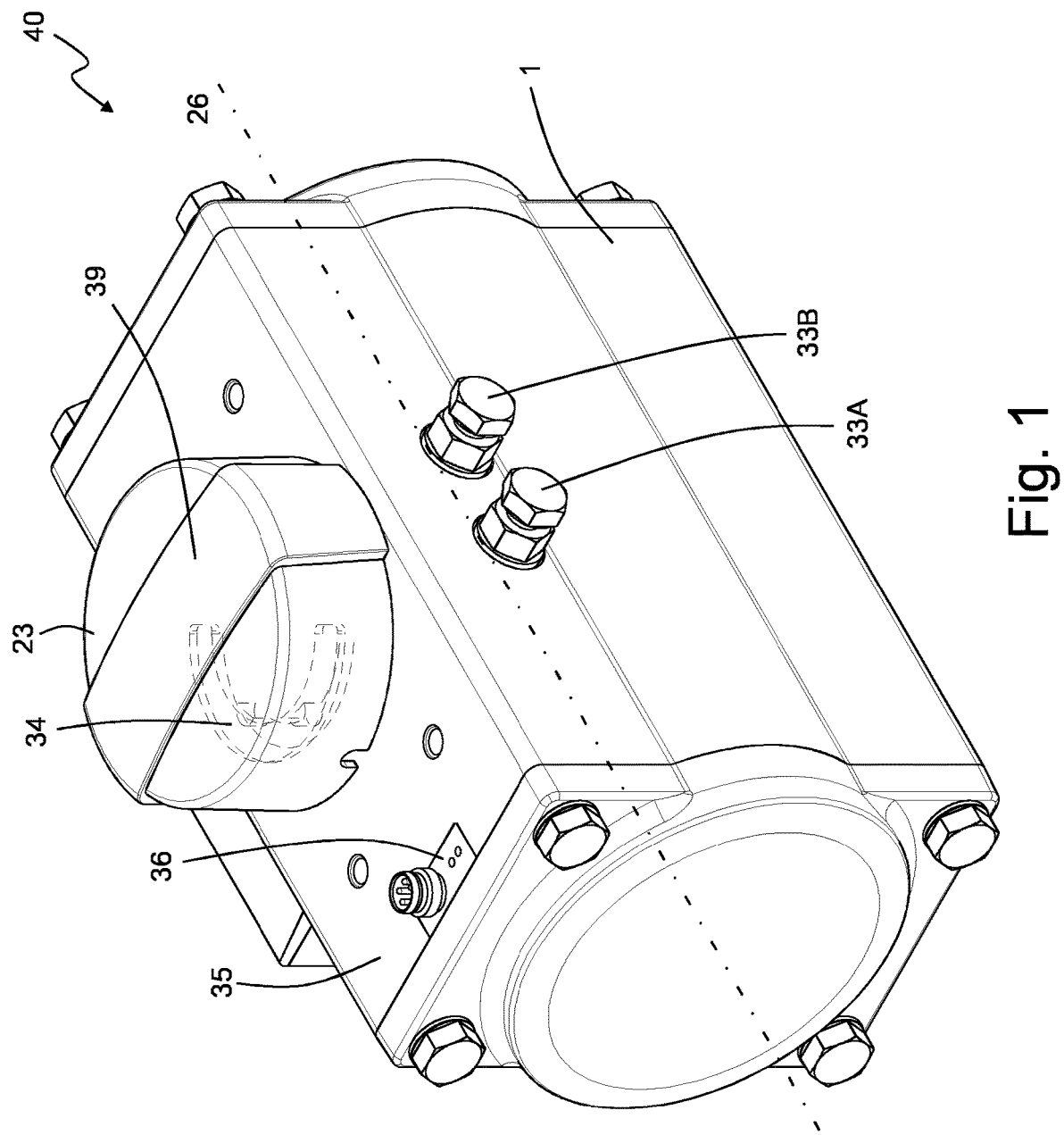
FIG. 1 shows a perspective illustration of a rotary drive according to a first embodiment.
Figure 2:
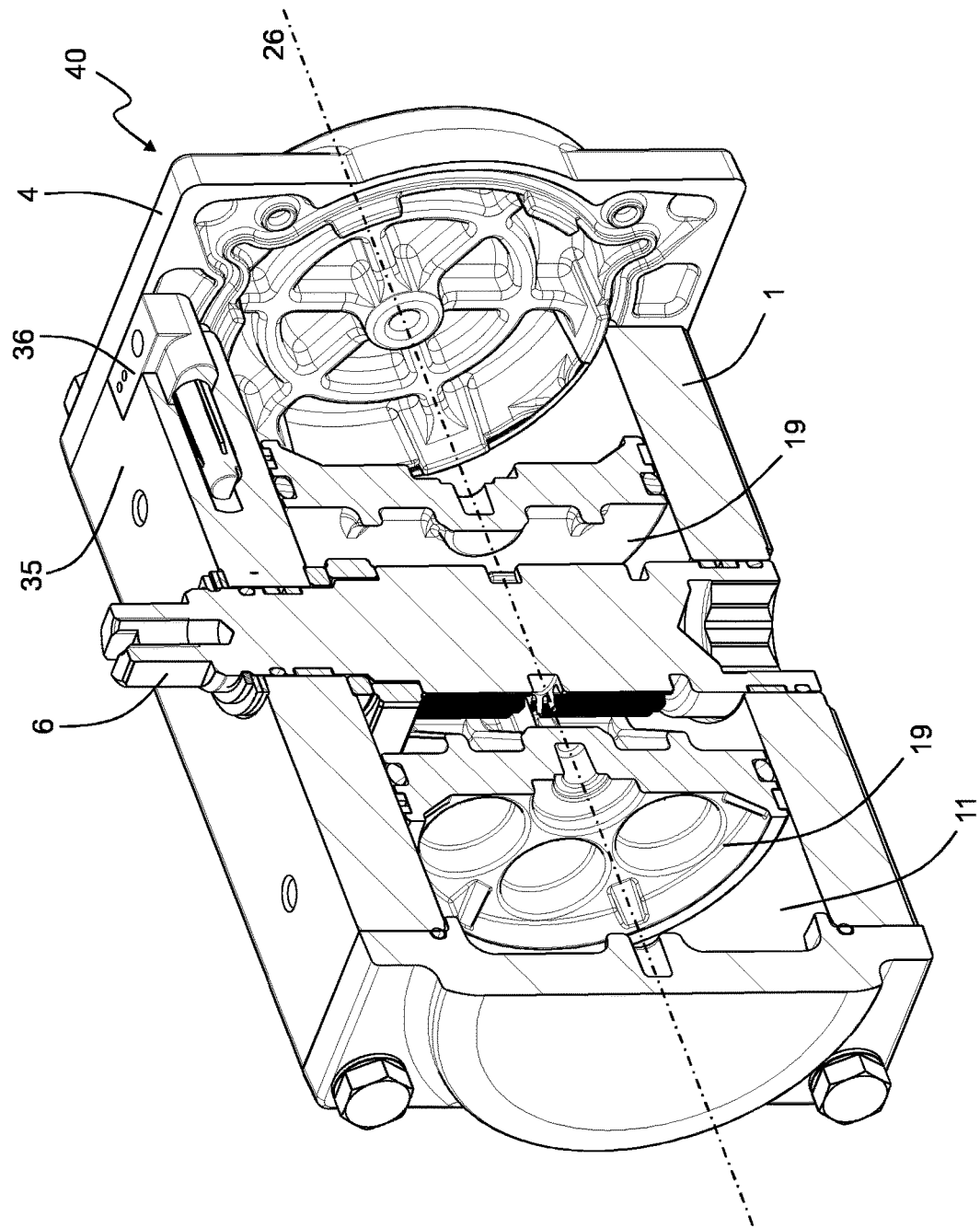
FIG. 2 shows a perspective cross-sectional illustration of the rotary drive according to the first embodiment.
Figure 3:
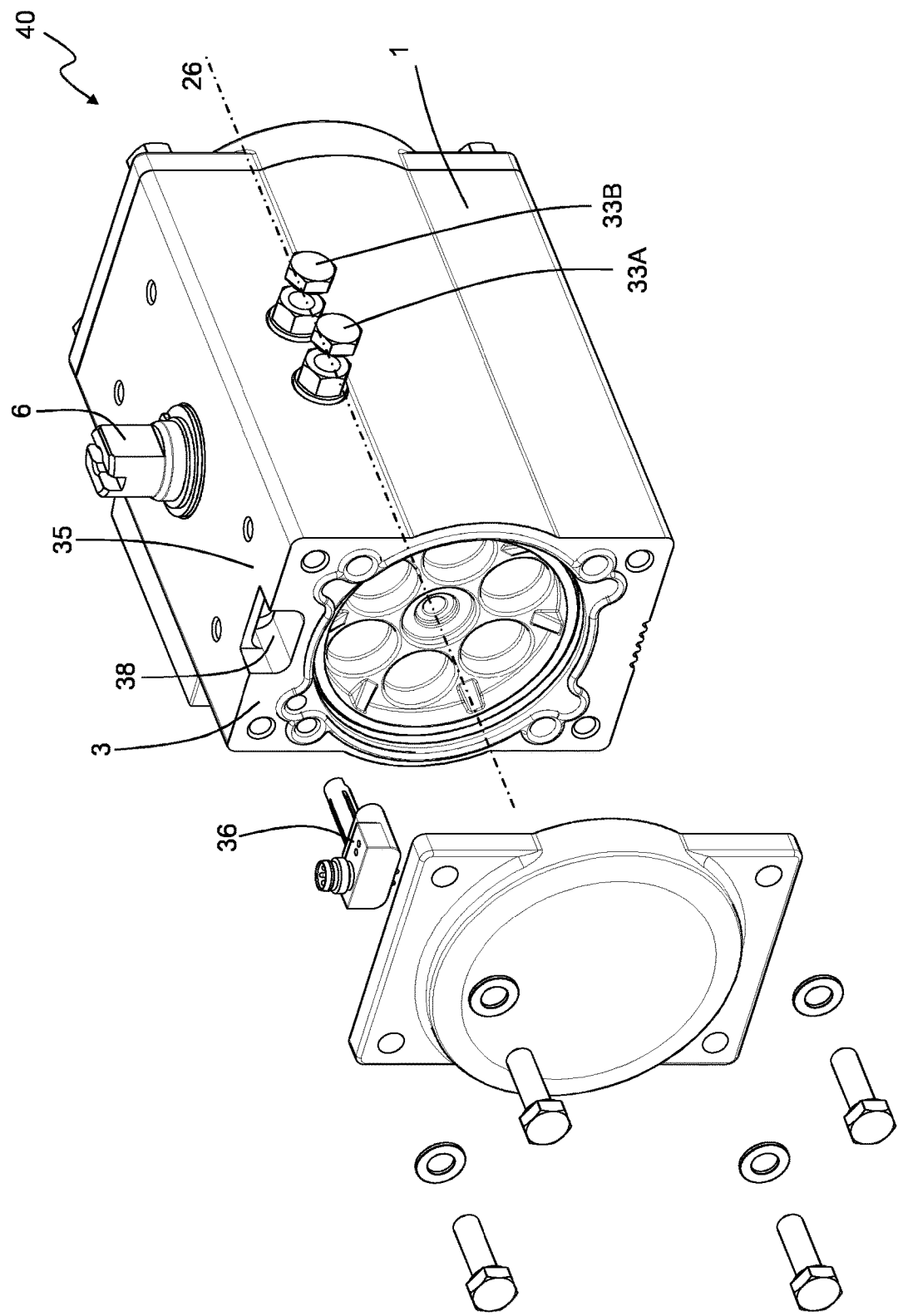
FIG. 3 shows an exploded illustration of the rotary drive according to the first embodiment.

FIGS. 1 to 3 show perspective illustrations of a rotary drive 40 according to a first embodiment.

The rotary drive 40 of the first embodiment is suitable for attaching to a valve fitting 24, in order to actuate a valve element of the valve fitting 24 and thus manipulate a fluid flow.

As shown in FIGS. 1 to 3, the rotary drive 40 comprises a housing 1 which has a drive device and a pivot-mounted driven shaft 6 which can be driven by the drive device. In the example shown in FIG. 2, the drive device in particular comprises a piston space 11 and a drive piston arrangement 19. The rotary drive 40 is hence fluid-actuated in the example shown. Alternatively, the rotary drive according to the invention can also be designed as an electromagnetic rotary drive.

The rotary drive 40 comprises a position detection device for detecting a position of the driven shaft 6. The position detection device in particular comprises a magnet module 23 which is adapted as a position indicator and is removably attached or fitted onto an axial end of the driven shaft 6 brought out of the housing 1. The magnet module 23 is connected to the driven shaft 6 in a torque-proof manner.

The position detection device also comprises a sensor module 36 which is arranged in a receiving chamber in a wall section 35 of the housing 1. The wall section 35 is the same wall section, out of which the axial end of the driven shaft 6 is brought.

The magnet module 23 comprises a magnet arrangement 34 which generates a magnetic field. The sensor module 36 is adapted to detect a magnetic field measurement value according to the magnetic field generated by the magnet module 23.

The rotary drive 40 further comprises a control device which in the example shown is integrated into the sensor module 36 and forms part of the position detection device. The control device is adapted to determine, according to the magnetic field measurement value detected by the sensor module 36, whether the magnet module 23 has been removed from the rotary drive 40 or the driven shaft 6 and, depending on the determination made, to cause the rotary drive to be put into a predefined operating state.

In the example described here, the control device is adapted to, when it has been determined that the magnet module 23 has been removed, adopt an error state and provide a corresponding error signal which shows that, at the moment, position detection is not possible. Preferably, the control device is also adapted to deleted, in the error state, magnetic field measurement values stored and assigned to the two end positions.

Alternatively or in addition to this, the control device may be adapted to, when it has been detected or determined that the magnet module has been removed, adopt one of the above described operating states, in particular a ventilation state, a maintenance state or an emergency shutdown state.

The control device is further adapted to determine or recognise, according to the magnetic field measurement value detected by the sensor module 36, that the magnet module 23 is being mounted onto the axial end of the driven shaft 6. In this case, the control device adopts a calibration state. In particular, the control device is adapted to store, in the calibration state, a magnetic field measurement value in assignment to an end position of the driven shaft if for a predefined period of time the magnetic field measurement value is constant within a predefined tolerance range.

The end positions of the driven shaft can be mechanically set by the user via the positioning means 33A and 33B. The driven shaft 6 may be moved to the end positions by issuing corresponding control commands to a control valve arrangement assigned to the rotary drive. The control commands may be issued to the control valve arrangement by the control device or by an external control unit.

In the example shown in FIG. 1, the magnet module 23 is designed as a position indicator which comprises an indicating element 39, via which the position of the driven shaft may be visually determined by a user.

FIG. 2 shows a cross-sectional illustration of the rotary drive 40. Here, in particular the drive piston arrangement 19 arranged in a piston space 11 and consisting of two drive pistons can be seen. The two drive pistons comprise respective toothed racks (not shown here) which are aligned in the axial direction and are in intermeshing engagement with a driven pinion gear arranged on the driven shaft 6, in order to convert a linear movement of the drive pistons into a rotational movement of the driven shaft 6. In particular, the toothed racks are arranged on opposite sides of the driven shaft 6, so that opposed linear movements of the drive pistons are converted into respective rotational movements of the driven shaft 6. In this way, the driven shaft 6 rotates in a first rotational direction when the drive pistons move towards one another and in a second rotational direction when the drive pistons move away from one another. As an alternative to the arrangement consisting of toothed racks and driven pinion gear, a tumbler yoke (Scotch yoke) can also be used to convert the linear movement of the drive piston arrangement 19 into a rotational movement of the driven shaft 6.

FIG. 3 shows an exploded illustration of the rotary drive 40. As shown in FIG. 3, a receiving chamber 38 is provided in the wall section 35 of the housing 1, into which the sensor module 36 is inserted. The receiving chamber 38 is open towards a face side 3 of the housing 1. The sensor module 36 in the inserted state can be covered by a housing cover and held in the receiving chamber 38.

Figure 4:
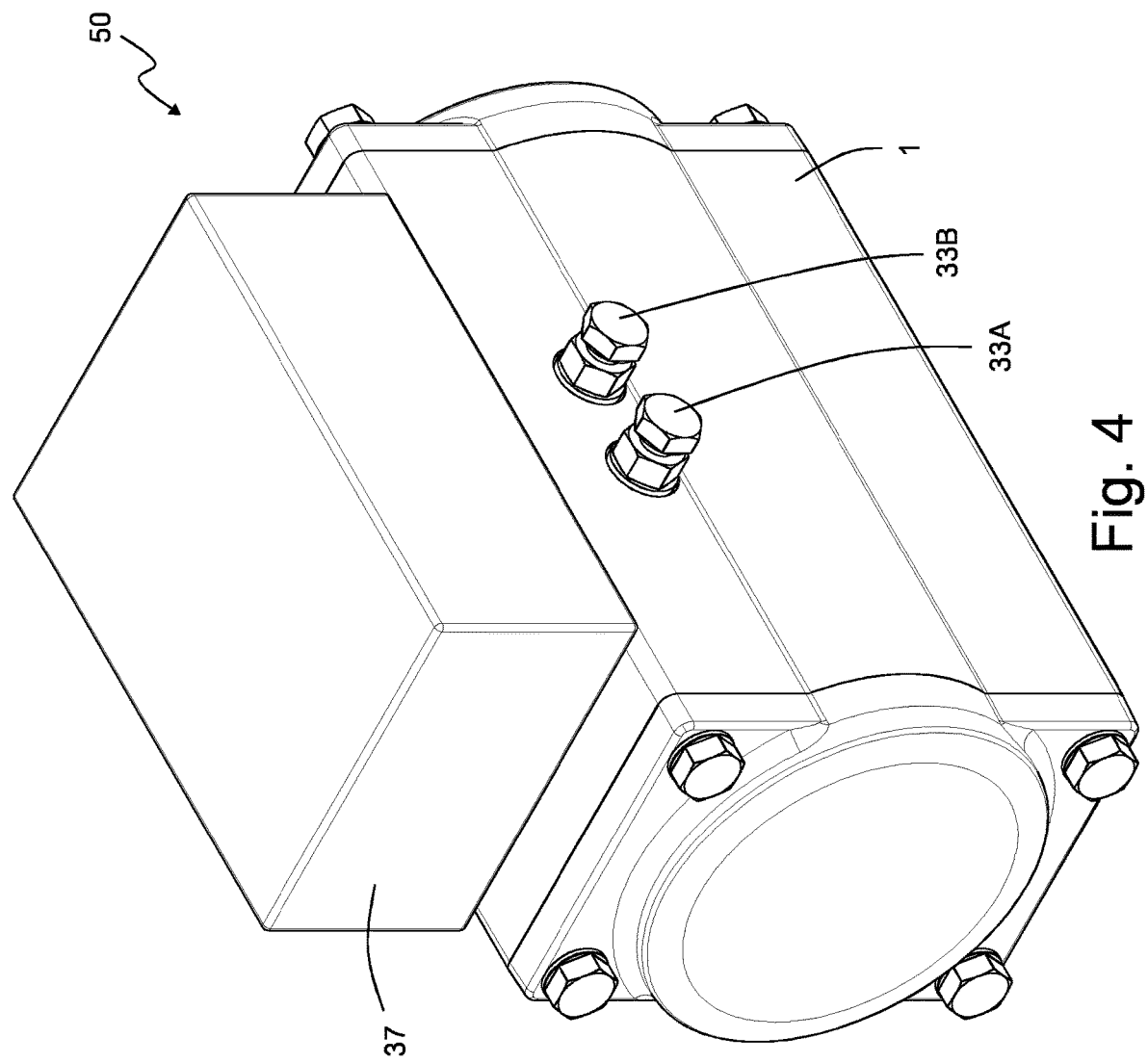
FIG. 4 shows a perspective illustration of the rotary drive according to a second embodiment.
Figure 5:
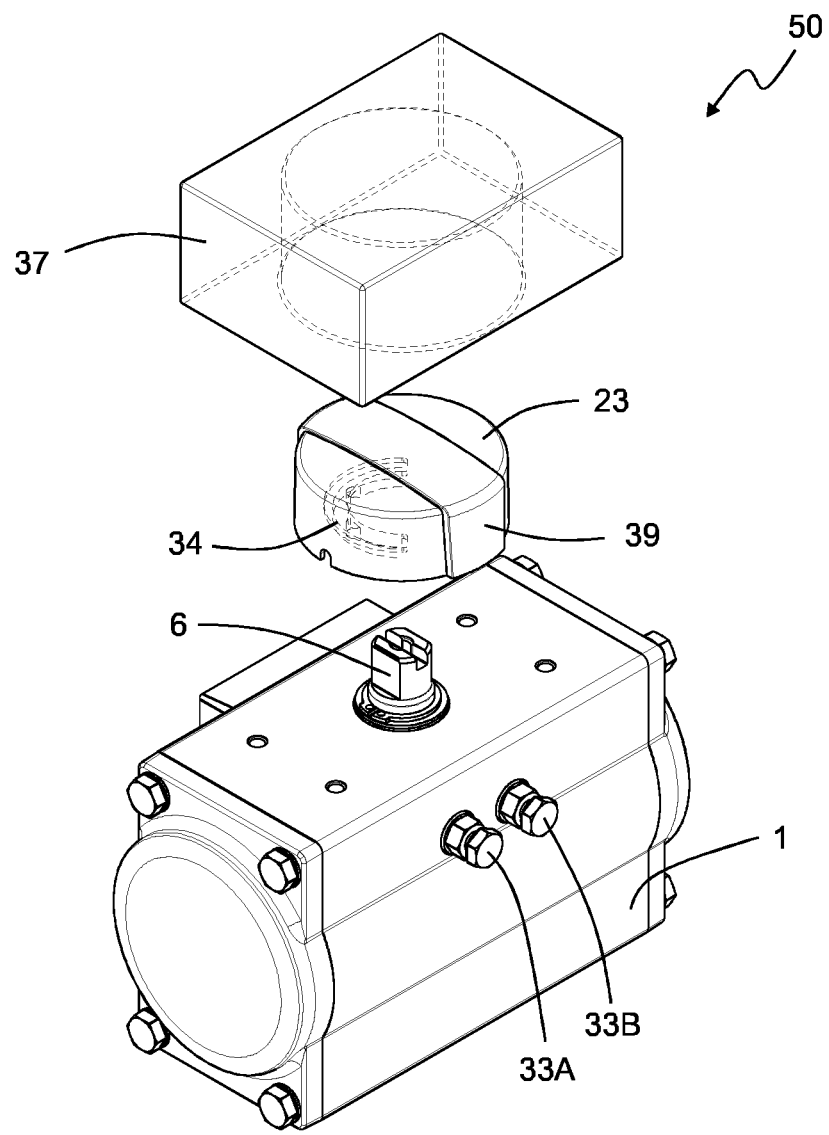
FIG. 5 shows an exploded illustration of a rotary drive according to the second embodiment.

FIGS. 4 and 5 show perspective illustrations of a rotary drive 50 according to a second embodiment.

The second embodiment differs from the first embodiment in particular in that, in the second embodiment, a sensor module 37 is provided which is arranged on the housing 1 such that it can be removed and is not, as in the first embodiment, arranged in a wall section of the housing.

Furthermore, in the second embodiment the control device is preferably provided separate from the sensor module 37 in or on the housing 1. For example, the control device can be arranged in a function module arrangement attached to the face side 3 of the housing 1.

In the second embodiment, the control device is designed to determine, on the basis of whether valid magnetic field measurement values are received at the control device or whether any magnetic field measurement values at all are received from the sensor element at the control device, whether the sensor module 37 is being removed from the housing 1 or is being attached to it.

By analogy with the above described embodiment, the control device is adapted to adopt an error state, if a removal of the sensor module 37 is determined, and to adopt a calibration state, if an attachment of the sensor module 37 is determined.

As shown in FIG. 5, the sensor module 37 is preferably box-shaped and has a hollow space, in which the magnet module 23 is accommodated when the sensor module is attached to the housing 1.

Figure 7:
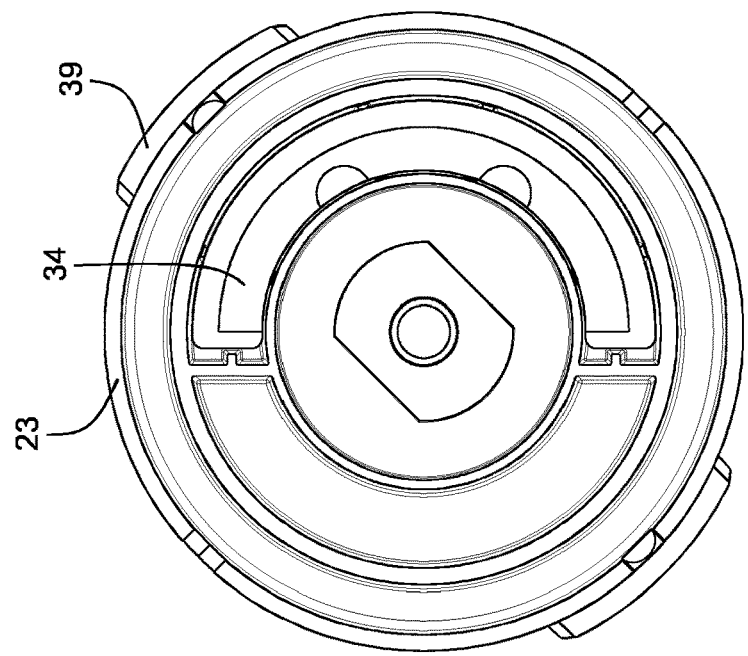
FIG. 7 shows a view from below of a magnet module of a rotary drive according to the first and second embodiments and FIG. 8 shows a perspective illustration of a process valve assembly according to a third embodiment.
Figure 6:
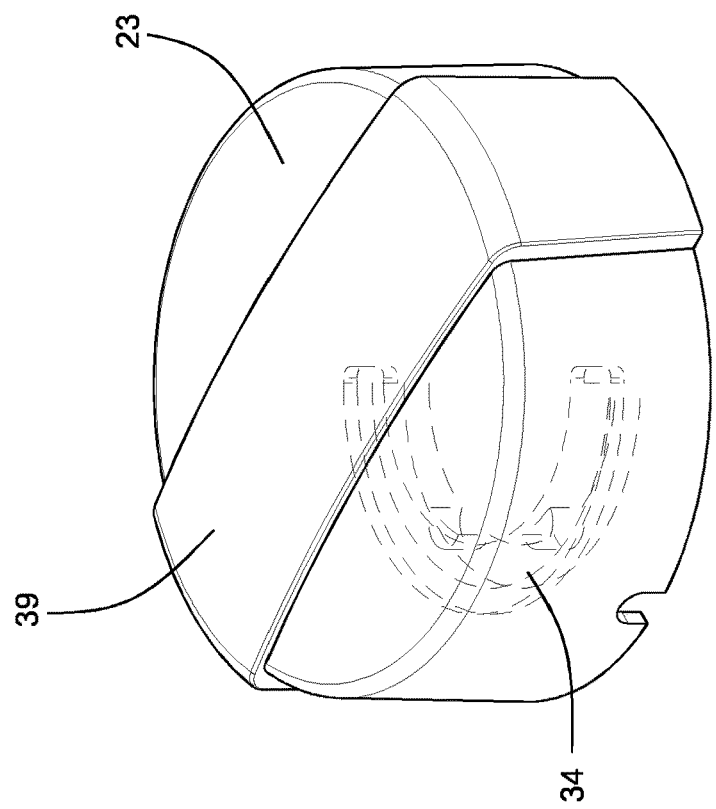
FIG. 6 shows a perspective illustration of a magnet module of a rotary drive according to the first and second embodiments.

FIGS. 6 and 7 show the magnet module 23 adapted as a position indicator. As described above, the position indicator comprises a bracket-shaped indicating element 39 and the magnet arrangement 34 formed as a ring segment. Preferably, the magnetisation of the magnet arrangement 34 varies along the circumference of the ring segment.

Figure 8:
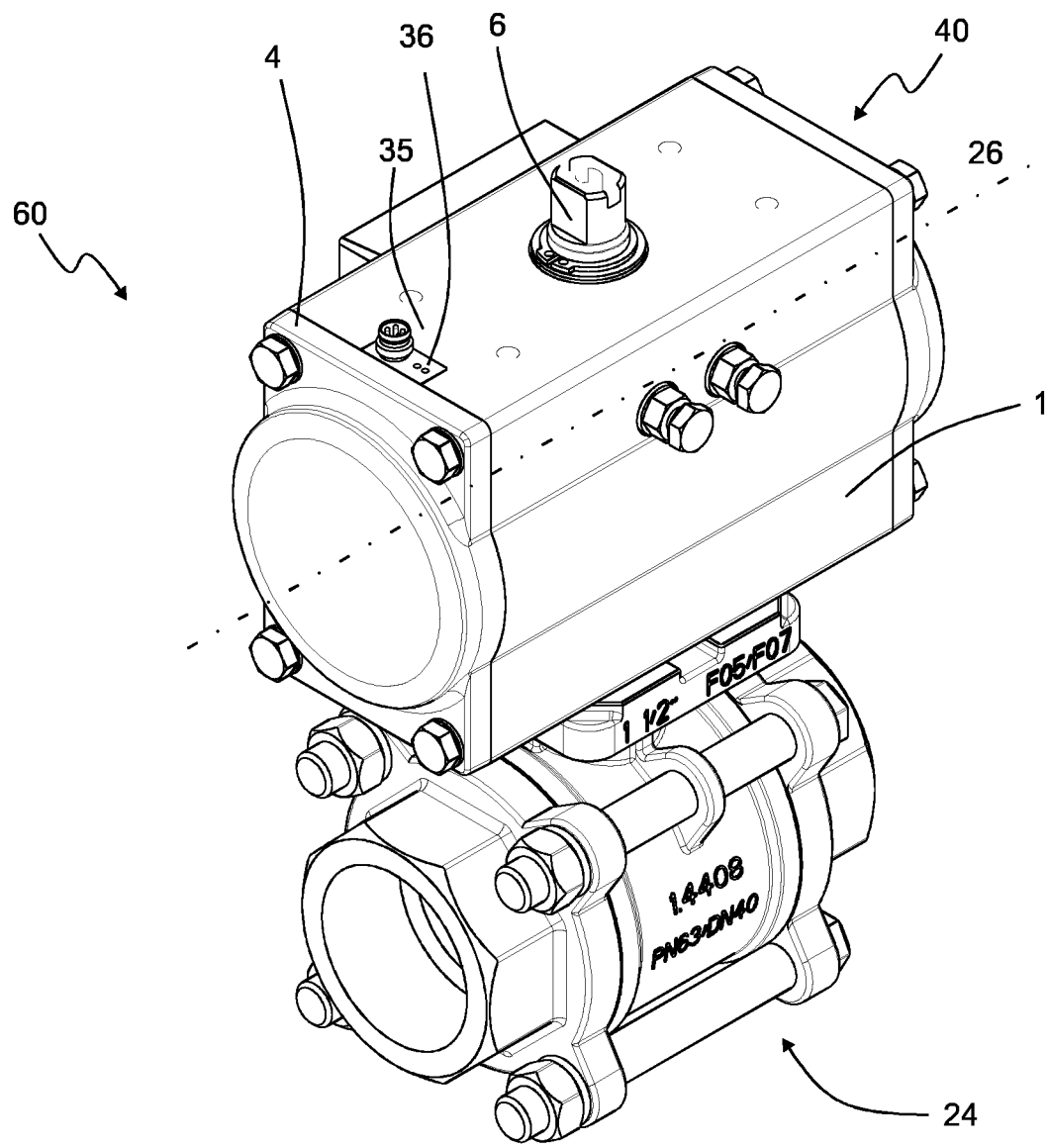

FIG. 8 shows a process valve assembly 60 according to a third embodiment. In the example shown, the process valve assembly 60 comprises a rotary drive 40 according to the first embodiment. As an alternative to this, the process valve assembly 60 can also comprise a rotary drive 50 according to the second embodiment.

The rotary drive 40 sits on a valve fitting 24 which has a spindle and a valve element. The driven shaft 6 is connected in a torque-proof manner to the valve element of the valve fitting 24 via the spindle. The angular position of the valve element is correspondingly determined from the angular position of the driven shaft 6. As a consequence, the position of the valve element can be derived from a position signal provided by the sensor module 36 or the control device and corresponding to the position of the driven shaft 6.

In operation, the process valve assembly 60 is provided with compressed air from a line connected to an external pressure connection of the rotary drive 40. The compressed air is, for example, drawn through a control valve arrangement (not shown here) which is preferably provided in a function module arrangement attached to the face side 3 of the housing 1 and is in particular designed as a 5-port/3-way valve. The outputs of the control valve arrangement are connected to chambers of the piston space 11 via corresponding working channels. The outputs of the control valve arrangement are switched to a pressure state or ventilation state according to a control command, in order to keep the drive pistons of the drive piston arrangement 19 in their current position or in a defined position or move them towards one another or away from one another. The control command is, for example, issued by the control device or another control unit assigned to the rotary drive. The driven shaft 6 is rotated by the movement of the drive pistons of the drive piston arrangement 19, whereby, in turn, the spindle of the valve fitting 24 and finally the valve element of the valve fitting 24 are rotated or actuated.

The magnet module connected to the driven shaft 6 in a torque-proof manner receives the rotational movement of the driven shaft 6, so that the location or position of the magnet arrangement 34 relative to the sensor module 36 is altered. Correspondingly, the magnetic field sensor value detected by the sensor module also changes. The position of the driven shaft 6 is determined based on the detected magnetic field sensor value. In addition, the control device determines, according to the magnetic field sensor value, whether the magnet module 23 is removed from the driven shaft 6 or is attached to it and correspondingly adopts an error state or a calibration state.

The invention claimed is:

1. A calibration method for a rotary drive for actuating a valve element of a valve fitting, the rotary drive having a housing, which has a drive device and a pivot-mounted driven shaft which can be driven by the drive device, and which can be coupled to the valve element, and a position detection device for detecting a position of the driven shaft, wherein the position detection device has a magnet module that can be attached to the driven shaft in a torque-proof manner and a sensor module which is fitted onto or into the housing and which is designed to detect a magnetic field measurement value according to the magnetic field generated by the magnet module, the rotary drive further comprising a control device, the method comprising:

attaching the magnet module to the driven shaft;

determining with the control unit, according to the magnetic field measurement value, that the magnet module is being attached to the driven shaft; and triggering a calibration process based on the determined attachment of the magnet module, wherein the calibration process comprises moving the driven shaft to a predefined position and the control unit storing a magnetic field measurement value, which is detected by the magnet module, in assignment to the predefined position.

2. The calibration method according to claim 1, wherein the control device stores the detected magnetic field measurement value in assignment to the predefined position of the driven shaft if for a predefined period of time the magnetic field measurement value detected by the sensor module is constant within a predefined tolerance range.

3. The calibration method according to claim 1, wherein the rotary drive is fluid-actuated and the drive device comprises a piston space, a drive piston arrangement, which is arranged in the piston space, is mechanically coupled to the driven shaft and subdivides the piston space into a plurality of chambers, and a control valve arrangement which supplies at least one of the chambers with a pressurised fluid.

4. The calibration method according to claim 1, wherein an axial end of the driven shaft is brought out of a wall section of the housing and, in the step of attaching the magnet module to the driven shaft, the magnet module is attached onto the axial end of the driven shaft.

5. The calibration method according to claim 1, wherein the magnet module is adapted as a position indicator which has an indicating element for visually indicating a position of the driven shaft and a magnet arrangement.

6. The calibration method according to claim 1, wherein the sensor module is arranged in a receiving chamber in a wall section of the housing.

\* \* \* \* \*